(12) United States Patent
Willart et al.

(10) Patent No.: US 9,807,554 B2
(45) Date of Patent: Oct. 31, 2017

(54) METHOD FOR SENDING STATUS INFORMATION FROM A SENDER TO A RECEIVER

(71) Applicant: TRUE HEADING AB, Danderyd (SE)

(72) Inventors: Nils Willart, Tyresö (SE); Anders Bergström, Djursholm (SE)

(73) Assignee: TRUE HEADING AB, Danderyd (SE)

(*) Notice: Subject to any disclaimer, the term of this patent is extended or adjusted under 35 U.S.C. 154(b) by 90 days.

(21) Appl. No.: 14/439,247

(22) PCT Filed: Nov. 8, 2013

(86) PCT No.: PCT/SE2013/051323
§ 371 (c)(1),
(2) Date: Apr. 29, 2015

(87) PCT Pub. No.: WO2014/074065
PCT Pub. Date: May 15, 2014

(65) Prior Publication Data
US 2015/0281900 A1 Oct. 1, 2015

(30) Foreign Application Priority Data
Nov. 9, 2012 (SE) ...................................... 1251277

(51) Int. Cl.
*H04L 1/18* (2006.01)
*H04W 4/02* (2009.01)
(Continued)

(52) U.S. Cl.
CPC .............. *H04W 4/023* (2013.01); *H04L 67/12* (2013.01); *H04W 4/12* (2013.01); *H04W 4/22* (2013.01); *H04W 84/18* (2013.01)

(58) Field of Classification Search
None
See application file for complete search history.

(56) References Cited

U.S. PATENT DOCUMENTS

| 7,805,146 | B1 | 9/2010 | Beyer | |
|---|---|---|---|---|
| 8,594,866 | B1 * | 11/2013 | Chen | B60L 3/00 701/21 |

(Continued)

FOREIGN PATENT DOCUMENTS

| EP | 2456256 A1 | 5/2012 |
|---|---|---|
| WO | 2010/101510 A2 | 9/2010 |

OTHER PUBLICATIONS

IALA Technical Clarifications on Recommendations ITU-R M.1371-1, Dec. 2002, Edition 1.3, pp. 1-87 (reference provided by applicants in IDS, not included again with office action).*

(Continued)

*Primary Examiner* — M. Mujtaba Chaudry
(74) *Attorney, Agent, or Firm* — Tucker Ellis LLP

(57) ABSTRACT

A method of sending the value of a status variable from a sending device to a receiving device as part of a standardized binary coded radio message. The message includes fields for predetermined information to be sent with the message as well as a buffer field. The method includes causing the sending device to assemble, calculate a checksum for, digitally store and periodically transmit a predetermined type of message in the form of a radio signal readable by a receiving device. The status variable is not related to the predetermined information. Before the checksum is calculated, the sending device inserts the value of the status variable in binary coded format into the message in a buffer field. According to a governing messaging standard, the buffer field is not intended to transmit information. The receiving device interprets the binary value as the value of the status variable.

9 Claims, 5 Drawing Sheets

(51) Int. Cl.
*H04W 4/12* (2009.01)
*H04L 29/08* (2006.01)
*H04W 4/22* (2009.01)
*H04W 84/18* (2009.01)

(56) References Cited

U.S. PATENT DOCUMENTS

| | | | |
|---|---|---|---|
| 8,838,985 B1* | 9/2014 | Robbins | H04B 1/38 340/851 |
| 2004/0264441 A1* | 12/2004 | Jalkanen | G06K 7/0008 370/352 |
| 2005/0027794 A1 | 2/2005 | Decker | |
| 2007/0224990 A1 | 9/2007 | Edge | |
| 2007/0273484 A1* | 11/2007 | Cederlof | H04W 52/0225 340/10.33 |
| 2009/0219843 A1 | 9/2009 | Chin | |
| 2010/0130219 A1 | 5/2010 | Cave | |
| 2011/0257819 A1* | 10/2011 | Chen | G01S 5/0027 701/21 |
| 2011/0261891 A1 | 10/2011 | Vos Gustar | |
| 2013/0279392 A1* | 10/2013 | Rubin | H04W 72/005 370/312 |

OTHER PUBLICATIONS

Extended European Search Report from corresponding European Application No. 13854113.1, dated Mar. 16, 2016.
"Mapping of sections of M.1371-1 to different kind of AIS stations", IALA Technical Clarifications on Recommendation ITU-R M.1371-1, Feb. 15, 2002, pp. 1-87.
Recommendation ITU-R M.1371-4, Technical Characteristics for an Automatic Identification System Using Time-Division Multiple Access in the VHF Maritime Mobile Band, International Telecommunications Union, Apr. 2010.
"Class E AIS, Will it be Huge?", Written for Panbo by Ben Ellison, Aug. 27, 2012.
International Search Report from corresponding International Application No. PCT/SE2013/051323, dated Apr. 10, 2014.
International Preliminary Report on Patentability from corresponding International Application No. PCT/SE2013/051323, dated Feb. 6, 2015.

* cited by examiner

METHOD FOR SENDING STATUS INFORMATION FROM A SENDER TO A RECEIVER

FIELD OF THE INVENTION

The present invention relates to a method for sending status information from a sender to a geographically proximate receiver. More precisely, the invention relates to a method for sending status information from an AIS (Automatic Identification System) sender to a locally arranged AIS receiver. Moreover, the invention relates to an AIS sender as well as to an AIS receiver for performing such sending of status information.

BACKGROUND OF THE INVENTION

For example, in shipping and aviation, the standardized communication system AIS is widely used for local communication between, for example, moving vehicles or between moving vehicles and fixed installations, such as a port or a lighthouse. See for example, "Recommendation ITU-R M.1371-4", published 2010 by the International Telecommunication Union.

Under this system, a set of digitally-coded, predefined messages of different types can be used by for instance a vessel in order to, among other things, inform recipients in local geographical proximity to the craft in question of its present position and speed. The different available message types are predefined in the sense that their outer form must comply with a predefined template, including the frequency band use, transmission interval and so on. Furthermore, each message must, apart from the information-carrying content, contain a certain opening and a closing binary number sequence, respectively, a checksum, and so on. Finally, the form used for the information bearing content of most messages is predefined in such a way that the binary positions in each respective message's information-carrying part comprises information of a given predefined type, such as the vehicle's current speed, on a certain predetermined binary number format.

There are also a number of messages whose information-carrying content (the so-called payload) can be used for transmission of binary coded information of general character, where a given subset of those binary positions which constitute the message can be used to transfer freely selectable such information. However, in practice the use of these messages for such purposes is strongly limited, because such use is subject to centrally issued recommendations. In other words, there is a degree of standardization also regarding which type of information that can be transferred via such general messages.

One reason for this far-reaching standardization of the AIS system is that there is also a standardization regarding the functionality of the different types of transmitters and receivers, which are to be able to put together and interpret, respectively, AIS messages sent between them. This means not only that the outer form and content of AIS messages must be consistent with that which is prescribed by the standard, but also, for example, that checksums are correct.

BRIEF SUMMARY OF THE INVENTION

However, it would be desirable to be able to use standard AIS equipment in order to be able to, in addition to the types of information already included in the AIS standard, transmit status information, in other words information regarding the state or status of a particular variable, between different AIS-connected devices.

Furthermore, it would be desirable to provide this in a cost efficient manner and with a minimum of necessary modifications of existing AIS equipment.

The present invention solves the problems described above.

Hence, the invention relates to a sending device for standardized binary coded radio messages within the scope of a distributed messaging system, in which system messages are sent directly between geographically proximate connected devices, as opposed to via a common central unit, which sending device comprises means for assembling and periodically broadcasting such messages of at least one predetermined type, which messages are readable by a receiving device for such messages, wherein a message of said predetermined type is intended, according to the messaging standard, to carry a certain predetermined type of information, wherein the sending device further comprises a sensing means arranged to detect that a message of the predetermined type is to be sent, wherein the message type comprises fields for that information as well as at least one buffer field which according to the message standard is not intended to carry any information, a message assembly means arranged to assemble, digitally store and calculate a checksum for a message of said predetermined type, and a sending means arranged to, upon the said detection by the sensing means, transmit the message in the form of a radio signal, and is characterized in that the sending device further comprises a data receiving means arranged to receive data representing the value of a status variable, where the status variable is not related to the predetermined type of information, and in that the sending device is arranged to insert the value of the status variable in digital form in the digital message stored in said buffer field before the checksum is calculated.

Furthermore, the invention relates to a receiving device for standardized, binary coded radio messages within the scope of a distributed messaging system, in which system messages are sent directly between geographically proximate connected devices, as opposed to via a common central unit, which receiving device comprises a receiving means for receiving and interpreting a message in the form of an incoming radio signal, and a decoding means for determining which of several predefined message types that the received message belongs to and to interpret the binary coded information comprised in the message, wherein a message of a certain predetermined type according to the messaging standard is intended to carry a certain predetermined type of information, characterized in that the receiving device further comprises an interpretation means arranged to read at least one binary data bit value from a buffer field in the message, which buffer field according to the messaging standard is not intended to carry information, and to interpret the binary value as the value for a status variable, wherein the status variable is not related to the predetermined type of information, and in that the interpretation means is also arranged to deliver the value of the status variable to a receiver.

BRIEF DESCRIPTION OF THE SEVERAL VIEWS OF THE DRAWINGS

The invention will now be described in detail, with reference to exemplifying embodiments of the invention and to the accompanying drawings, wherein.

DETAILED DESCRIPTION OF THE INVENTION

Figure 3:
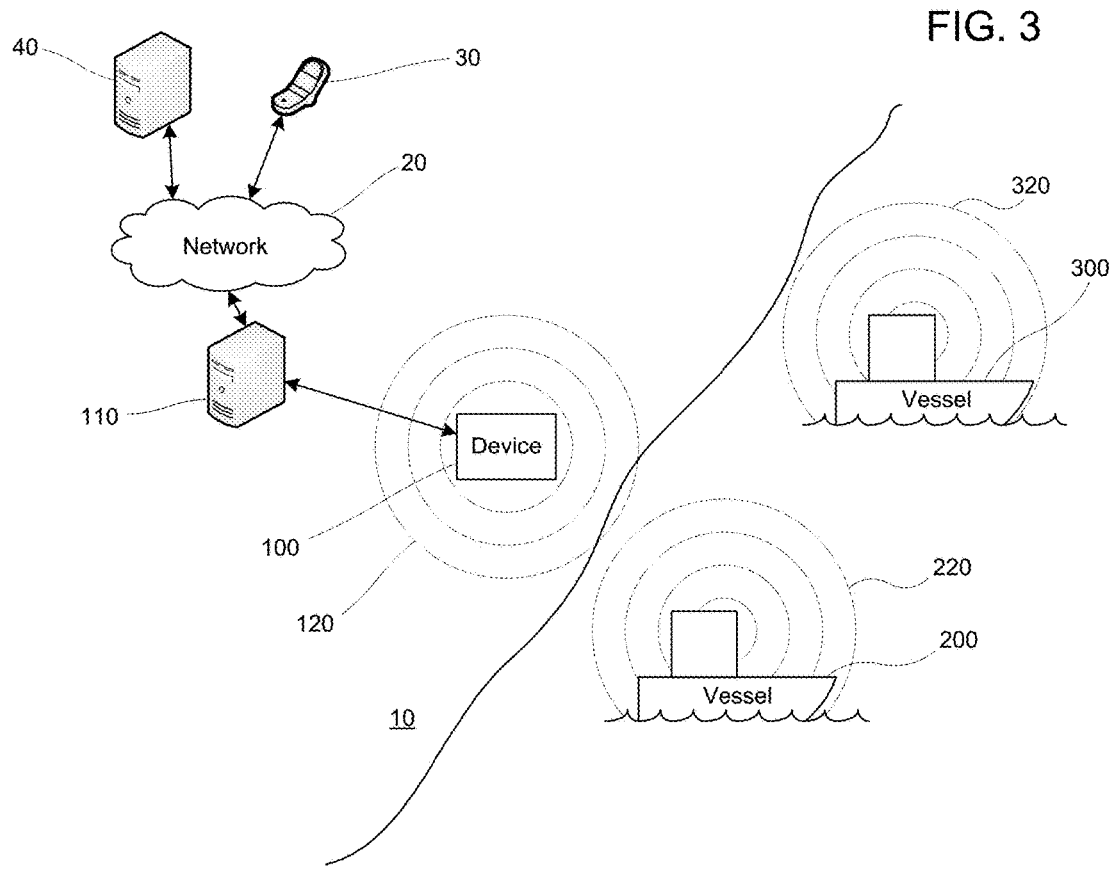
FIG. 3 is an overview diagram illustrating devices which may be used in a method according to a first embodiment of the invention.
Figure 4:
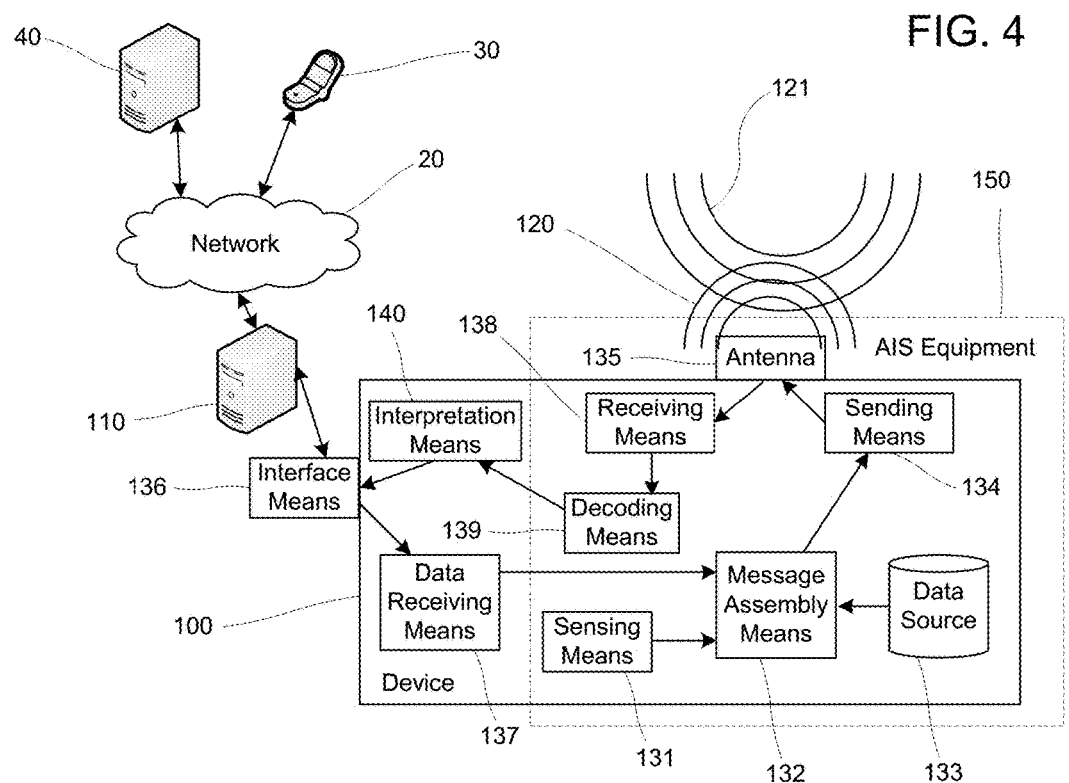
FIG. 4 illustrates the functionality of a piece of equipment according to the invention, which equipment is permanently installed on land.
Figure 5:
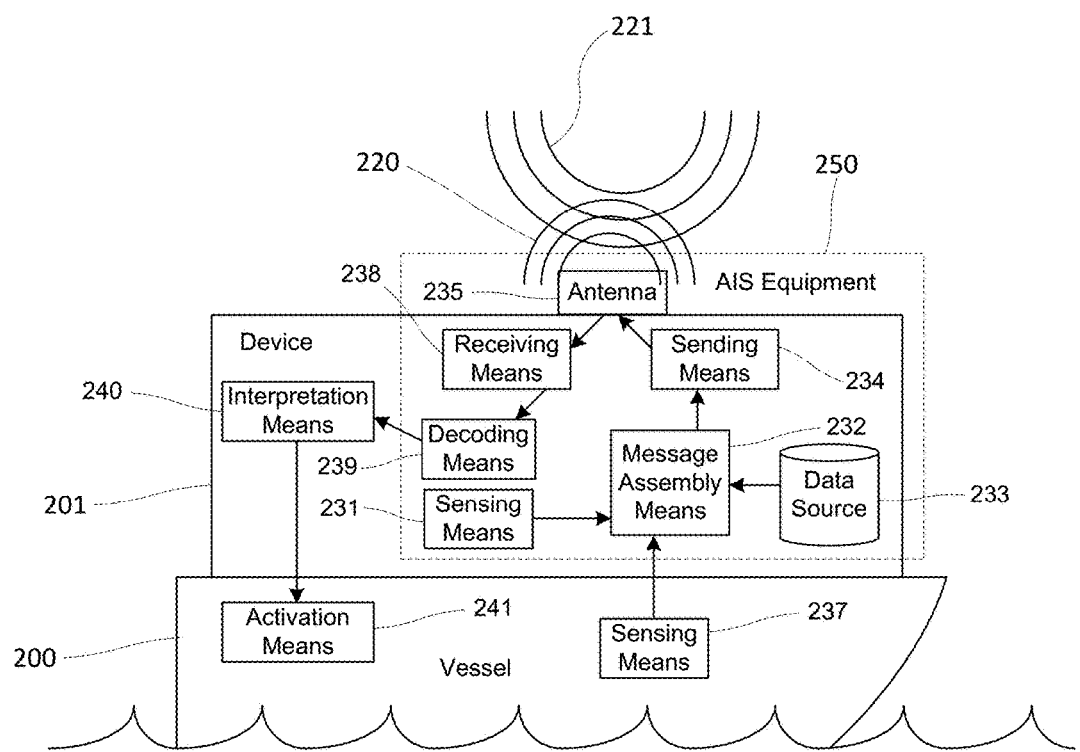
FIG. 5 illustrates the functionality of a piece of equipment according to the invention, which equipment is mounted on a moving vessel.

FIGS. 3-5 share reference numerals for same parts.

AIS is an example of a distributed messaging system, under which standardized binary coded radio messages can be sent directly between geographically proximate connected devices, without the need for a common central unit via which messages need to be sent. The system is based on that AIS-connected transmitters emit various types of standardized messages periodically, and on that the various transmitters comprised in the system themselves distribute the available bandwidth across each transmission time period between them.

FIG. 3 shows a piece of equipment 100, permanently or fixedly installed on land, for sending and receiving AIS messages, as well as movable vessels, in the form of boats 200, 300, disposed on the water off a coast 10, which vessels are arranged with respective equipment for sending and receiving AIS messages. AIS messages in the form of radio signals 120, 220, 320 are illustrated schematically.

As is shown in FIG. 3, all AIS senders transmit to all AIS receivers that are within the receiving range of the AIS sender in question. Although all connected devices 100, 200, 300 are not necessarily of the same standardized type, they will, when brought together geographically, establish a self-organizing communication network between themselves based on timesharing over a certain transmission period. How this is done is within the scope of the AIS standard, and is conventional as such.

It is understood that the time sharing can be done in different ways. According to the AIS standard, each sending device has access to sufficiently accurate information regarding the current time in the current transmission period, and can therefore periodically send one or more messages at certain predetermined time points over each transmission period. Alternatively, a sending device can read the current signal strength from other sending devices, and according to certain rules initiate their own transmission of a message when the signal strength drops to a level close enough to the background noise (so-called CSTDMA, Carrier Sense Time Division Multiple Access). Everything described herein regarding timesharing is applicable to both these and other ways to timeshare the transmission time across a certain transmission period.

It is realized that the devices 100, 200, 300 illustrated in FIG. 3 may equally well be other types of fixed units, such as a fixed transponder installed at an airport and other types of moving vessels such as aircraft or wheeled vehicles.

Different types of AIS messages are meant for different types of information, where examples comprise information regarding the current location, speed, rate of turn, destination, weight and so on, for the connected device. Different types of AIS messages are transmitted according to the AIS standard at different time periods and with different powers, depending inter alia on the type of transmitter concerned.

These and other aspects of the AIS system are regulated, for example, in the recommendation ITU-R M.1371 (above). More information is also available in the documentation provided by the International Maritime Organization (IMO).

At the time of writing, there are 28 different AIS message types defined according to the AIS standard. These 28 types have a common overall structure, but are designed to carry different types of information. Most are designed to carry the values of a number of predefined parameters on respective predefined data formats, but AIS messages 6, 8, 25 and 26 are instead designed to carry more freely, binary coded information. However, there are international, national and regional rules for how such binary coded information shall be used, which makes it cumbersome to use these AIS messages to transmit user-defined information types. In addition, in many cases external equipment is required to read the contents of these AIS messages.

Figure 1:
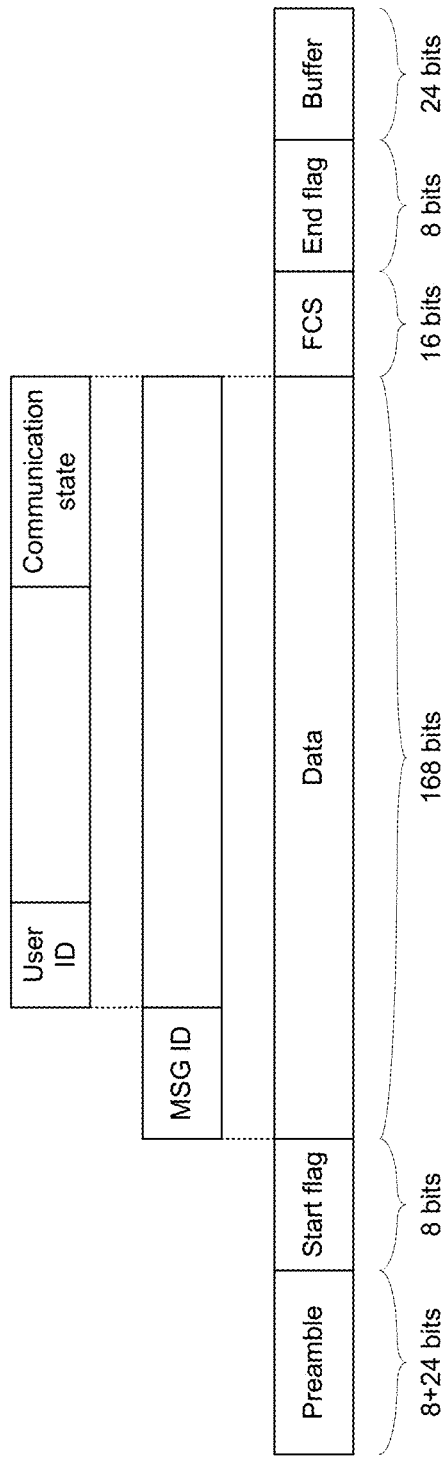
FIG. 1 shows the structure of a general AIS message.

FIG. 1 illustrates the general data structure of an AIS message, comprising the following binary encoded fields. A "bit" is one or zero.

Preamble: an introductory sequence of 8+24 bits.

Start flag and End flag: both include 8 pieces and serve as separators for the AIS message.

Data: 168 bits comprising, apart from the actual information to be transferred, the message identifier MSG ID, the sender identifier User ID and the field Communication state.

FCS: a 16 bit checksum that is calculated based on the contents of the Data field, and the purpose of which is to be able to verify the integrity of the AIS message contents.

Buffer: 24 bits that can be used in predefined ways to communicate information such as transmission distance and signal quality.

Hence, of the total length of 256 bits, a certain part of the Data field is used for the actual transfer of the parameter values.

Figure 2:
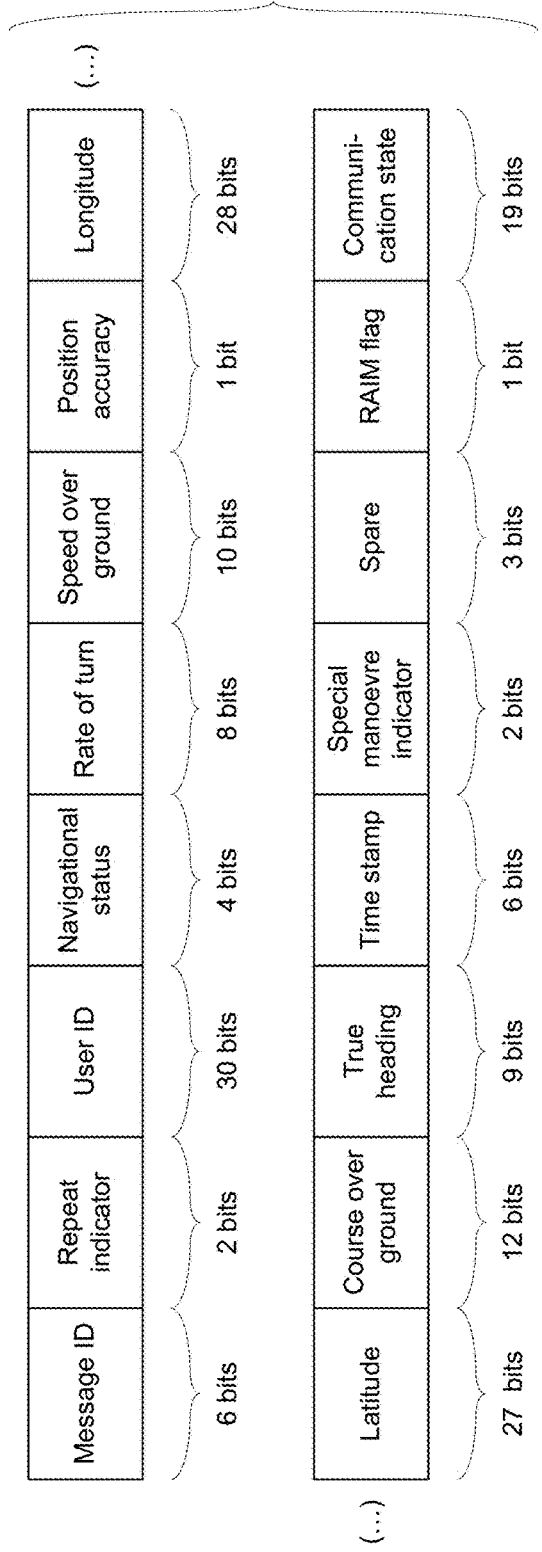
FIG. 2 shows the detailed structure of an exemplifying, specific AIS message.

In different types of AIS messages, the field Data is structured in different predefined ways. FIG. 2 illustrates an example of such a construction, in this case for the AIS message number 1 ("Position Report").

As shown in FIG. 2, the payload is strictly divided into a number of fields each having a predetermined number of bits, such as "Message ID" (6 bits) and "Longitude" (28 bits).

According to the AIS standard, in many AIS messages there are some bits in the field Data that are not used. In the AIS standard, these bits are called "spares", and it is recommended to set these bits to 0 when sending AIS messages. In the AIS message illustrated in FIG. 2, the "Spare" field contains 3 bits. The following table indicates the number of such "spare" bits available for each of the 28 different message types:

| Message type | Num of spares |
| --- | --- |
| 1 | 3 |
| 2 | 3 |
| 3 | 3 |
| 4 | 9 |
| 5 | 1 |
| 6 | 1 |
| 7 | 2 |
| 8 | 2 |

| Message type | Num of spares |
| --- | --- |
| 9 | 3 |
| 10 | 2 |
| 11 | 9 |
| 12 | 1 |
| 13 | 2 |
| 14 | 2 |
| 15 | 2 |
| 16 | 4 |
| 17 | 5 |
| 18 | 8 |
| 19 | 4 |
| 20 | 2 |
| 21 | 1 |
| 22 | 23 |
| 23 | 24 |
| 24 | 0 |
| 25 | 6 |
| 26 | 0 |
| 27 | 0 |
| 28 | 1 |

FIG. 4 illustrates the functional structure of a sending device 100 according to a preferred embodiment, comprising means for assembling and periodically sending AIS messages of at least a certain predetermined type, which AIS messages are readable by a receiving device for AIS messages. It is preferred that the sending device 100 adheres to the specifications for a particular AIS type (such as "Class A", "Class B", base stations, AtoN (Aids to Navigation), SART (Search And Rescue Transmitter), and so on), and thereby is capable of, at certain time periods, emitting a certain set of different types of AIS messages.

The sending device 100 comprises a sensing means 131, arranged to detect that an AIS message of the predetermined type, or possibly other types, is to be sent, for example based on the time frame allocated to the sending device 100 in the distributed system, or on CSTDMA.

Furthermore, the sending device 100 comprises a message assembly means 132, arranged to assemble, digitally store and compute a checksum for an AIS message of the said predetermined, and possibly other, types. The message assembly means 132 receives the information to be sent in the AIS message, among other things or at least, from a data source 133, which may comprise information such as the geographical position, the sender identity, and so on.

The sending device 100 also comprises a sending means 134, arranged to, at the said sensing of the said sensing means and using an antenna 135, transmit the AIS-message in the form of the transmitted radio signal 120.

The types of AIS messages for which the invention can be applied are those that according to the AIS standard comprise fields for the predetermined type of information to be transmitted, as well as at least one buffer field which according to the AIS standard is not intended for conveying any information. Such buffer fields are thus not the "Buffer" of FIG. 1, but the fields described above as "spare" bits.

According to the invention, the sending device 100 namely also comprises a data receiving means 137, arranged to receive data representing the value of a status variable, wherein the status variable is not related to the certain type of information which is predetermined by the AIS standard. The message assembly means 132 is arranged to read said data, and to incorporate the value of the status variable, in digital form, in the digitally stored AIS message in said buffer field, of "spare" type, before the checksum is calculated and the AIS message thereafter is transmitted.

Since the binary data stored in such buffer fields is not normally taken into account by AIS-compatible receivers, and because the checksum is calculated after the value of the status variable has been inserted into buffer fields in the AIS message, a typical AIS receiver that receives and interpret the AIS message will accept the AIS message without questioning the integrity of its content. A receiver according to the invention (see below) can, via the AIS message, receive the transmitted information concerning the value of the status variable, whereas a conventional AIS receiver that is not equipped to read such values, in a completely conventional way can read the other information in the received AIS message, without the presence of the additionally stored information having any effect.

A very important aspect of the present invention is that the information transmitted via said buffer fields, namely the value of the status variable, does not relate to the predetermined type of information that, according to the AIS standard, is to be sent in the current AIS message type, for the AIS message in which the status variable is inserted. For example, the status variable may be a flag indicating that accessibility for vessels is limited to a predefined area in the vicinity of the sending device 100, and the value "1" ("true") or "0" ("false") can be sent in a "spare" bit of an AIS message type 2, which does not contain this type of information according to the AIS standard. Another example is that the status parameter is the alarm condition according to the embodiment described below.

Typically, different types of AIS messages are sent with different repetition frequencies, depending on how time critical the information they contain is deemed to be.

By use of the present invention, the repetition frequency for certain status information can however be varied, by it being sent as part of several consecutive AIS messages of the same and/or different types. For example, the sender and receiver may beforehand have entered into an understanding that the status information of a particular first type always is to be transmitted in one or more of some "spare" bits of AIS messages of one or more specific first types, and that status information of a certain second type always is to be transmitted in one or more certain "spare" bits of AIS messages of one or more particular second types, implying that the receiver can always interpret the transmitted information correctly and that information can be transmitted with a certain desired minimum repetition frequency. If a particular status variable is always transmitted via a certain "spare" bit in several different respective AIS message types, the value of the status variable can be updated frequently whenever so is desired. In addition, the respective values of several different status variables can be transferred in one single AIS message, by the available "spare" bits in the message being allocated in a predetermined manner across the status variables the values of which are to be transferred.

Thus, the information transmitted through the conventional data structure of a certain AIS message may vary, irrespectively of the information sent according to the invention, using the buffer field. For example, the position information may change or be the same between the two positioning messages, depending on whether or not the sender has moved between the transmission times, while a status variable that indicates if an alarm has occurred may also change or be the same between the two positioning messages, independent of any positional change.

FIG. 4 further illustrates a server 110, arranged to communicate with the parts of the sending device 100, such as the data receiving means 137, via an interface means 136. It is understood that the server 110, for instance, can be centrally arranged for wireless or wired communication with several local sending devices 100, alternatively, some or all of the functional parts of the sending device 100 may be comprised of software modules, themselves being installed and active on the server 110 during operation. Thus, the server 110 is either connected to the sending device 100 or comprises the sending device. Furthermore, the server 110 is connected, via a data communications network 20 such as the Internet, to a computer 40 and a mobile device 30, such as a mobile phone. One objective of the server 110 is to allow the sending device 100 to be in communication connection with a user of the computer 40 or mobile device 30, so that the user can remotely receive and/or send information from and to the sending device 100 (see below).

According to a preferred embodiment, the status variable comprises a digitally stored instruction regarding whether or not a predetermined function, which is specifically linked to a movable vessel 200, 300 arranged to receive the sent AIS message, will be activated or not. In this case, the instruction is translated to a value of a corresponding status variable, such as a binary number where "1" represents "activated" and "0" corresponds to "not activated".

The function may be any suitable function, but it is preferred that the instruction refers to a function that can be switched on or off, whereby "activate" means to go from the off to the on state, and vice versa for "disable". Examples comprise a car heater or an engine heating device, lighting, the cooling function of a refrigerator; as well as an entire system, such as an alarm-, electricity- or pumping system; or a combination of such devices or systems.

According to a preferred embodiment, in this case the sending device 100 is used as a part of a remote control device, which also includes the server 110. The user enters a manifestation of his or her will through the computer 40 or device 30, which offers an appropriate user interface therefore, which manifestation is received by the server 110 in the form of a digitally stored instruction. The remote control device is arranged to then, in response to the receipt of the said instruction, cause the sending device 100 to send the instructions further, as the status variable in one or more appropriate AIS message as described above.

Especially preferably, the sending device 100 is arranged to, once the digitally stored instruction has been received via the interface means 136, insert the value of the status variable into the respective above-described buffer field in several successive, periodic transmissions of the same type of AIS message, preferably in such periodic transmissions over a predetermined period of time, or alternatively at most until a new instruction has been received via the interface means 136, which new instruction is intended to replace the previous one. Suitably, the latest instruction can be stored in the means 132 or in the database 133.

FIG. 5 illustrates in more detail the functional parts of a receiving device 201 which is permanently mounted on the boat 200, arranged to receive AIS messages as described above. The receiving device 201 comprises a receiving means 238 for receiving and interpreting an AIS message from an antenna 235, which AIS message is in the form of an incoming radio signal 221 which in the present example is the same signal as the transmitted signal 120, and a decoding means 239 for, based on the AIS standard, determining to which one of several predefined AIS message types according to the AIS standard the received AIS message belongs, and interpreting the binary coded information contained in the AIS message. It is preferred that the decoding means 239 is not arranged to specifically interpret information in the "spare" bits, but that the decoding means 239 is arranged to convey such information further, via an external interface.

Hence, in the above way, which was described in connection to the sending device 100, the AIS message carried by the signal 221 comprises the value for a status variable which has binary been stored in a buffer field, which according to the AIS standard is not used. The status variable thus comprises information regarding whether or not the above discussed certain predetermined function, which is specifically linked to the movable vessel 200 on which the receiving device 201 is mounted, should be activated.

In order to read and interpret the binary encoded contents of the buffer field, an interpretation means 240 exists, arranged to read the received AIS message, or at least the "spare" bits, in binary form, to identify the binary encoded data in said buffer fields and to translate that data into a value for the status variable in question. For this purpose, the interpretation member 240 may comprise additional means, such as timing means or message type sensing means, for determining which status variable that has previously been agreed to transmit in the just received AIS message.

An activation device of the present invention comprises, besides the receiving device 201, also an activation means 241, arranged to activate the said function of the vessel 200 in response to a change of the value of the received status variable from a first value in a first received AIS message, to a second value, in a second received AIS message received after the first AIS message was received.

The interpretation body 240 is thus arranged to deliver the value of the status variable to a receiver such as the activation means 241.

The activation means 241 may be for example a mechanical actuator adapted to act on a piece of equipment mounted on the vessel, such as a cooling or heating function, or a software function arranged to control any type of software-controlled function of the vessel 200, such as an alarm system.

In the event that more vessels 200, 300, with the ability to detect and interpret additional information in AIS messages according to the invention, may be or are located in the same geographic local area, it is preferred that at least one, preferably a single, predetermined, specific recipient is addressed. For example, this way a certain specific boat can be ascertained that a particular function on board, such as heating, is to be switched on or off, without other boats also therefore having to receive such an instruction. This can be done in several different ways. In many cases, especially if the transmitter is comprised in a ground-mounted AIS base station, the value of the status variable can be transmitted in one or more spare bits in a message that is of targeted nature, in other words where a recipient is specified. Exemplifying targeted AIS messages include message number 12 (Addressed safety related message). Alternatively, the value of the status variable may be transmitted in one or more spare bits in a message in which a field that identifies the sending party (such as the AIS field "Source ID") is set to a value which is not the normal value for the sending party, but another, preferably unique, value, which has previously been agreed between the sending party and the intended receiving party, so that the receiving party at the reception of the AIS message in question, after reading said identifying field, can interpret the received message so that it contains a value of a status variable that is intended to be received by the recipient.

What is here said about directing status information to one or more specific recipients also applies to the below-described embodiment, in which information is transmitted from a vessel 200 to a land-based receiver 100, as well as in transmission between two movable vessels 200, 300.

According to a preferred embodiment, which will now be described, the above-described receiving device 201 instead constitutes a sending device, and the above described sending device 100 constitutes a receiving device. In this case, the status variable comprises information of whether or not a predetermined event has occurred for the movable vessel 200 on which the sending device 201 is mounted.

Furthermore, an alarm device according to the invention comprises both the sending device 201 and a sensing means 237. The sensing means 237 is arranged to detect a physical change on board the vessel 200 and to further such a physical change to the message assembly means 232. In other words, the sensing means 237 constitutes a data receiving means, similar to the means 137. Examples of sensing means 237 comprise a motion-, camera- or contact sensor, arranged to respond to attempted burglary; a heat-, smoke-, water-, grounding- or cooling guard; a wind- or rain sensor; a clock designed to react at a certain preset time; or the like; or combinations thereof.

The alarm device is adapted to, in response to such detected physical change, allow the sending device 201 to send information regarding the said change in the form of a corresponding value of a status variable, which in a manner similar to that described above is encoded into a buffer field in one or several AIS messages, which buffer field or buffer fields is or are not used according to the AIS standard.

Thus, the sending device 201 comprises a sensing means 231, arranged to detect that an AIS message of a particular type is to be sent, based for example on the time frame allocated for the sending device 201 in the distributed system, or CSTDMA; a message assembly means 232, arranged to receive information from a source 233 and setting together, digitally storing and calculating a checksum for an AIS message of the said type; and a sending means 234, arranged to use the antenna 235 to transmit the AIS message in the form of an emitted radio signal 220. All this corresponds to the function of the above described parts 131-135.

The incident signal 121 which carries the AIS message with the status information binary coded in "spare" bits, is then detected using the antenna 135 in the receiving device 100, is received by a receiving means 138 and is interpreted by a decoding means 139, which substantially correspond to the above described means 238 and 239. An interpretation means 140, corresponding to means 141, is then arranged to read the received AIS message, or at least the "spare" bits, in binary form, to identify the binary encoded data in said buffer fields and to translate that data into a value for the current status variable, possibly by using input from further means such as timing means or message type sensing means, all as described above. The value of the detected status variable is then transmitted via the interface means 136 to the server 110. The server 110 is arranged to, in response to a change in the value of the status variable from a first value in a first AIS message, to a second value, in a second AIS message received after the first AIS message, send an alarm message via the network 20 to the computer 40 and/or the mobile telephone, whereby a user can acquire knowledge about the event sensed in the vessel 200.

It will be appreciated that such an alarm message may also be received and processed as described above in connection with the reception of an AIS message by the receiving device 201, so that a certain measure is automatically performed by means of an actuator in response to a changed value of a transmitted status variable.

It is preferred that, when the device 201 is regarded in its capacity of host, the antenna 235, the receiving means 238, the decoding means 239, the sensor means 231, the message assembly means 232, the data source 233 and the sending means 234 constitute parts of an in itself conventional piece of AIS equipment 250, which is arranged to, via an external interface, be able to make available all of the respective information carrying parts of received AIS messages to the interpreting means 240. Such AIS equipment is today commercially available, and the received data can typically in a relatively uncomplicated manner be subjected to computer processing and interpretation after receiving via said interface. Similarly, the means 131-135 and 138-139 can be subcomponents in a per se conventional AIS equipment 150 which, via a similar external interface, makes available the raw binary data to the means 140.

This thus enables an existing, as such conventional AIS receiver to be provided with an interpretation means 140, 240 according to the present invention, whereby the system gains the capacity to receive and interpret status information encoded and sent out via the "spare" bits of AIS messages as described above. Many times, the said interface consists of a software module, which makes it possible for the means 140, 240 to be implemented as a software function on existing hardware. This leads to a particularly cost-efficient and simple, and therefore preferred, configuration.

Correspondingly, in some instances, the means 137, 237 may be connected to an existing, as such conventional AIS equipment 150, 250, via an existing, preferably software-implemented, external interface, via which the binary-coded contents of transmitted AIS messages can be affected.

According to a preferred embodiment, the sensing means 237 is also arranged to activate the AIS equipment 250, which therefore only starts the transmission of AIS messages once the sensing means 237 has detected the above described physical change.

Thus, the invention provides a simple and cost-efficient way to enable communication between a sender and a receiver, by beforehand agreeing on a certain pattern according to which the data will be coded within a pre-agreed, unused binary data field in a predefined message, and in many cases using existing, conventional equipment that only needs to be complemented with additional functionality. That some senders and receivers apply the invention does not affect the operation of other connected senders and receivers.

Above, preferred embodiments described. However, it is apparent to the skilled person that many changes can be made to the disclosed embodiments without departing from the basic idea of the invention.

For instance, the status information may comprise other types of information than the above described function-activating instructions and alarm calls.

Thus, for example two moving 200, 300 vessels may jointly agree on sending any kind of information between them, as long as the information does not relate to information already given in AIS messages, and that can be encoded within the limited space offered of "spare" bits in transmitted AIS messages. For example, this way a vessel can signal that it carries some type of dangerous goods to certain specific recipients or to all connected recipients.

Thus, the invention is not limited to the disclosed embodiments, but may be varied within the scope of the enclosed claims.

The invention claimed is:

1. A radio device for sending automated identification system (AIS) messages directly to one or more geographically proximate connected AIS devices and not via an intermediate device, comprising:
an AIS equipment that broadcasts an AIS message having a predetermined format defined by an AIS standard, the predetermined format defined by the AIS standard for the AIS message having: i) predetermined data fields, each one of the data fields populated with predetermined binary coded information, and ii) a buffer field that is defined in the AIS standard to be not used for information; wherein, to broadcast the AIS message, the AIS equipment is configured to:
sense a first condition under which the AIS message is to be sent;
assemble the AIS message in response to sensing the first condition, including populating the data fields with the predetermined binary coded information corresponding to the first condition and calculating a checksum for the AIS message; and
transmit the AIS message and repeat the transmission on a periodic basis; and
an interface communicatively coupled between the AIS equipment and at least one of a computing device or a sensor, the interface configured to:
receive, from the computing device or the sensor, a data value indicating status of a second condition for which there is no corresponding data field in the predetermined format defined by the AIS standard for the AIS message; and
wherein assembly of the AIS message by the AIS equipment further includes, prior to calculation of the checksum, insertion of a status variable value in the buffer field, the inserted status variable value having a predetermined relationship to the data value indicating status of the second condition.

2. The radio device according to claim 1, wherein the status variable value comprises a remote control command that indicates to the one or more geographically proximate connected AIS devices whether or not a predetermined function, which is specifically associated with a movable vessel associated with the one or more geographically proximate connected AIS devices, is to be activated.

3. The radio device according to claim 1, wherein the status variable value comprises information regarding whether or not a predetermined event has occurred for a movable vessel on which the radio device is mounted.

4. A radio device for receiving and processing automated identification system (AIS) messages, the AIS messages being of plural predetermined formats defined by an AIS standard for AIS messages, comprising:
an AIS equipment configured to:
receive an instance of an AIS message directly from an AIS sending device and not via an intermediate device; and
determine a one of the plural predetermined formats under which the instance of the AIS message is formatted, the format under which the instance of the AIS message is formatted having: i) predetermined data fields, each one of the data fields populated with predetermined binary coded information; and ii) a buffer field that is defined in the AIS standard to be not used for information; and
an interface communicatively coupled between the AIS equipment and at least one of a computing device or an actuator, the interface configured to:
read a status variable value from the buffer field in the instance of the AIS message, the status variable value corresponding to an input for the computing device or the actuator and relating to a condition for which there is no corresponding data field in the predetermined format defined by the AIS standard for the instance of the AIS message; and
deliver the status variable value to the computing device or the actuator.

5. The radio device according to claim 4, wherein the status variable value is a changeable remote control command that indicates whether or not a predetermined function, which is specifically associated with a movable vessel associated with the radio device, is to be activated.

6. The radio device according to claim 4, wherein the status variable value comprises information regarding whether or not a predetermined event has occurred for a movable vessel from which the instance of the AIS message is sent.

7. A method for sending automated identification system (AIS) messages directly to one or more geographically proximate connected AIS devices and not via an intermediate device, comprising:
receiving, from a computing device or a sensor and with an AIS radio assembly, a data value indicating status of a first condition;
sensing, by the AIS radio assembly, a second condition under which an AIS message is to be sent, the AIS message having a predetermined format defined by an AIS standard, the predetermined format defined by the AIS standard for the AIS message having: i) predetermined data fields, each one of the data fields populated with predetermined binary coded information; and ii) a buffer field that is defined in the AIS standard to be not used for information, and wherein there is no data field in the predetermined format defined by the AIS standard for the AIS message corresponding to the first condition;
assembling, by the AIS radio assembly, the AIS message in response to sensing the second condition, including populating the data fields with the predetermined binary coded information corresponding to the second condition, inserting a status variable value in the buffer field wherein the inserted status variable value has a predetermined relationship to the data value indicating status of the first condition, and calculating a checksum for the AIS message; and
transmitting, by the AIS radio assembly, the AIS message and repeating the transmission on a periodic basis.

8. The method according to claim 7, wherein:
the status variable value comprises a remote control command that indicates whether a predetermined function, which is specifically associated with a movable vessel, is to be activated.

9. The method according to claim 7, wherein:
the AIS radio assembly is mounted on board a movable vessel, and
the status variable value indicates whether a predetermined event has occurred or not for the movable vessel.

* * * * *